United States Patent
Danti

[15] 3,674,147
[45] July 4, 1972

[54] CHECK VALVE
[72] Inventor: Bernard Danti, Lexington, Mass.
[73] Assignee: Millipore Corporation, Bedford, Mass.
[22] Filed: Feb. 8, 1971
[21] Appl. No.: 113,185

[52] U.S. Cl. ........................................210/136, 137/515.5
[51] Int. Cl. ...................................B01d 35/18, B01d 35/02
[58] Field of Search ..................210/136; 137/515.5, 533.24

[56] References Cited

UNITED STATES PATENTS

| | | | |
|---|---|---|---|
| 2,918,083 | 12/1959 | Clark, Jr. et al. | 137/515.5 |
| 1,784,622 | 12/1930 | Dardahl | 210/136 UX |
| 3,379,213 | 4/1968 | Billington | 137/515.5 |
| 2,223,509 | 12/1940 | Brauer | 137/533.29 X |

*Primary Examiner*—Frank A. Spear, Jr.
*Attorney*—Kenway, Jenny & Hildreth

[57] ABSTRACT

A check valve adapted for use in one end of a filter cartridge to permit steam sterilization downstream of the cartridge without disintegrating the filter material. The valve has a generally cylindrical housing, a cap adapted to fit within the housing and an O-ring adapted to fit around said cap under tension. The housing has a shoulder extending inwardly from its inside circumferential surface. The cap having an upper, generally cylindrical portion with a diameter less than the inside diameter of the housing at the shoulder, a circumferential recess adapted to house said O-ring out of contact with the inside surface of said housing and a lower generally cylindrical shelf with a diameter greater than the inside diameter of the housing at the shoulder, the recess being located between said upper and lower portions.

6 Claims, 6 Drawing Figures

PATENTED JUL 4 1972

INVENTOR
BERNARD R. DANTI

BY

Kenway, Jenney & Hildreth
ATTORNEYS

PATENTED JUL 4 1972

INVENTOR
BERNARD R. DANTI

BY

*Kenway, Jenney + Hildreth*
ATTORNEYS

CHECK VALVE

This invention relates to a check valve construction, particularly useful in a sterile environment.

Cartridge filters are useful in high volume filtration of liquids or gases and are particularly useful for removing particulate microbiological contaminants. These filters are made from a wide variety of materials including cellulose esters such as cellulose acetate or cellulose nitrate which exhibit poor strength characteristics in the presence of steam. Therefore, the use of steam is impractical as a means for sterilizing the filter and its surrounding environment when the filter is in place for use. This has necessitated alternative sterilization techniques such as ethylene oxide. However, the use of sterilizing means other than steam has not been accepted in many areas, and the use of cartridge filters has been reduced materially. Therefore, there is a present need for providing a sterilizing means that permits the use of steam in the environment downstream of the filter without damaging the filter material.

The present invention provides a check valve that prevents contact of steam with the filter medium during sterilization with pressurized steam yet permits fluid flow from the filter after sterilization. The check valve comprises a housing, the outside diameter of which fits into an outlet for fluids, as for example, an outlet associated with a filter. The inside diameter of the housing is generally cylindrical and has a shoulder around its inside circumference that extends toward the center of the housing. A movable cap is located within the central portion of the housing and is retained therein by means of a sealing ring. The cap is shaped so that the upper portion fits within the inside surface formed by the housing shoulder and the lower portion of the cap has a shelf with a diameter greater than the inside diameter of the shoulders but less than the inside diameter of the housing. The cap has a groove around its circumference adjacent the shelf so that the groove can house the sealing ring.

Prior to application of pressure on the bottom surface of the cap, it is retained in the housing with an undersized sealing ring in tension that is placed between the inside surface of the housing and the outside surface of the top portion of the cap. When gas pressure is applied on the bottom surface of the cap, it moves upwardly within the housing so that the sealing ring is retained under pressure between the horizontal inside surface of the housing shoulder and the inside surface of the cap shelf. When pressure is released from the bottom surface of the cap, pressure on the sealing ring exerted by the shelf also is released and the sealing ring is retained in the cap groove. The groove is shaped so that the sealing ring can fit therein under little or no tension and when in its retracted position, it no longer exerts substantial frictional force with the housing wall. Thus, when pressure is released there is no force retaining the cap within the housing and it drops out of the housing under gravity, and when the housing corresponds to a filter outlet, it becomes unobstructed thereby permitting fluid flow therethrough. However, if filtrate back-pressure should develop, the sealing ring in the groove can still form a seal between the horizontal inside surface of the housing shoulder and the cap itself.

The invention will be described more fully with reference to the accompanying drawings.

Figure 1:
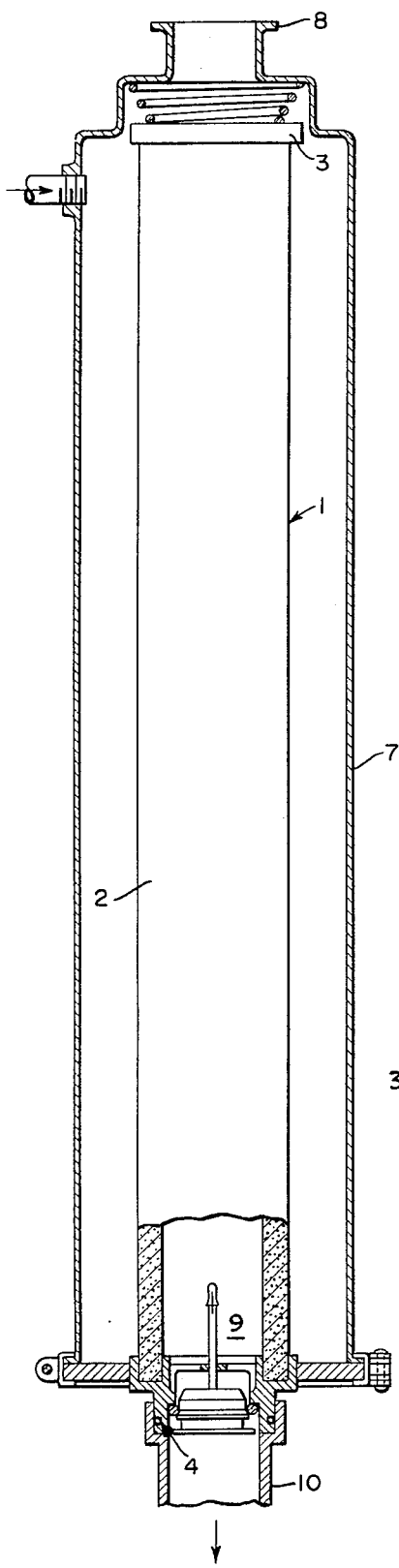
FIG. 1 is a partial vertical cross-sectional view of a filter cartridge in housing utilizing this invention.
Figure 2:
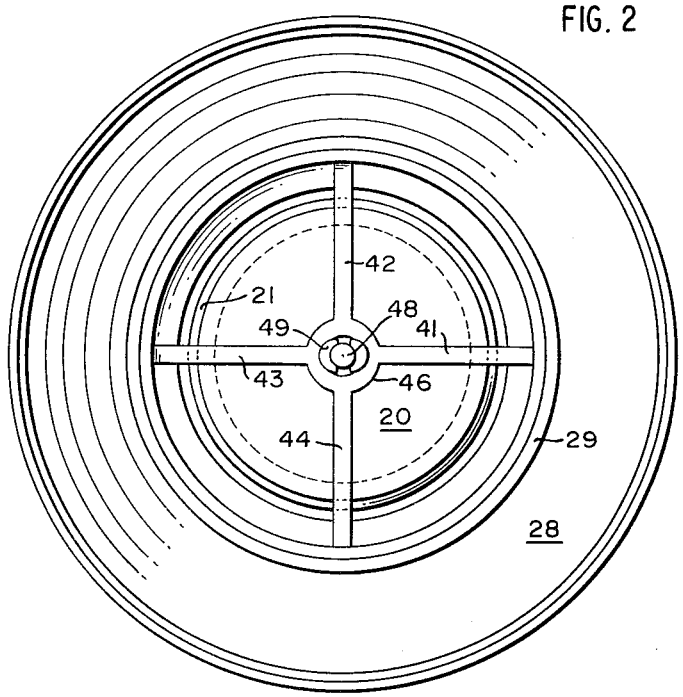
FIG. 2 is a top view of the cap construction of this invention.

Referring to FIG. 1, a cylindrical filter cartridge generally indicated at 1 comprises a tubular filter material 2 sealed at the top end with a cap 3 and fit into holder 4. The cartridge 1 is placed in housing 7 having an inlet 8 adapted to admit fluid to be passed through the filter 1. It is sometimes desirable to employ the filter cartridge 1 as a means to sterilize fluid by the filtration mechanism and in such instances, the inner surface of the filter 1 as well as the apparatus downstream thereof must be maintained sterile. Thus, the collection means 10 as well as the inside surface of the cap housing 4 must be made sterile. Since the filter cartridge 1 is prepackaged under sterile conditions, it need not be resterilized prior to use. However, the collection apparatus 10 and the cap housing 4 downstream of the filter 1 need be sterilized prior to initiating filtration. In prior art apparatus, steam sterilization could not be employed after the cartridge 1 was placed in its proper position for filtration since steam under pressure in the collection means 10 would enter the cartridge 1 through the outlet 9 and damage the filter material.

Figure 3:
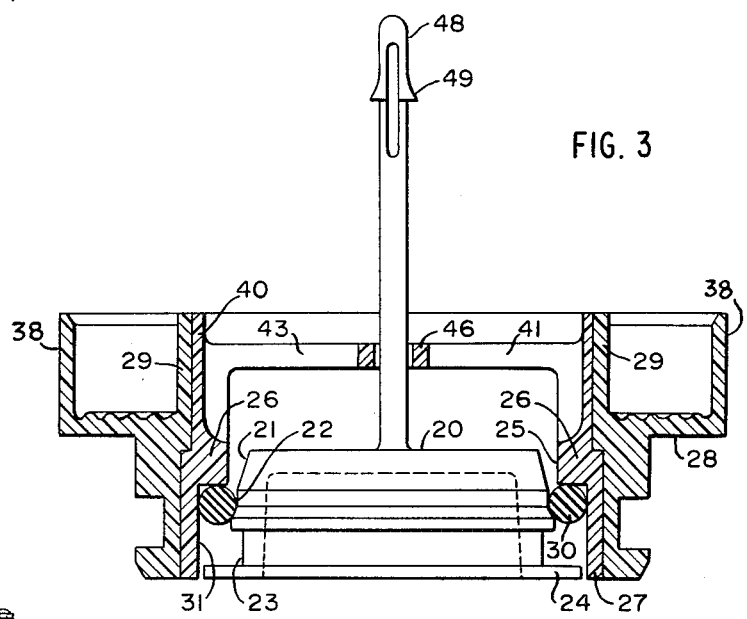
FIG. 3 is a vertical cross-sectional view of the cap construction prior to exerting pressure on the bottom surface thereof.

Referring to FIGS. 2 through 5, a pressure-movable cap 20 has a top portion formed of a beveled surface 21, a generally cylindrical section 22, a beveled shoulder 39, a circumferential groove 23, and a lower shelf 24. The cylindrical section 22 is shaped so that it forms a relatively close fit within the inside surface 25 formed by shoulder 26 of cylindrical housing 4. The beveled surface 21 is shaped so that frictional forces exerted by an O-ring placed between it and the inside surface of holder 4 are sufficient to retain the cap 20 in the holder 4. The beveled shoulder 39 allows steam pressure to increase adequately to sterilize the groove 23 before the cap 20 moves further upward after steam pressure is initiated. The housing 9 fits into holder 4 having shoulders 29 and 38 within which a filter cartridge can be sealed. As shown in FIG. 3, O-ring 30 forms a seal between the outside cylindrical surface 22 of cap 20 and the inside cylindrical surface 31 of housing 4. When the cap 20 is in the position shown in FIG. 3, there is no fluid communication between the interior of cartridge 1 and the collection means 10. When no pressure is applied to the bottom surface of cap 20, it is retained within housing 4 by means of frictional forces between the cylindrical surface 22, the surfaces 22 and 39 of cap 20 and the O-ring 30.

Figure 4:
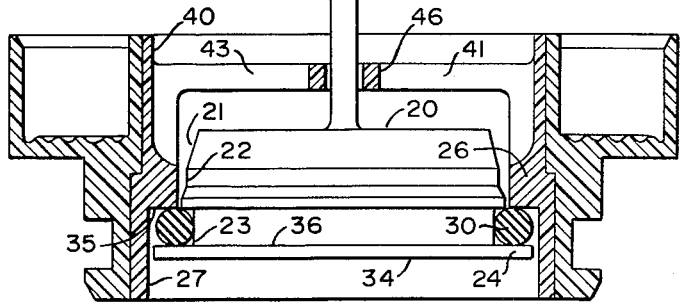
FIG. 4 is a vertical cross-sectional view of the cap construction during application of pressure on the bottom surface.
Figure 5:
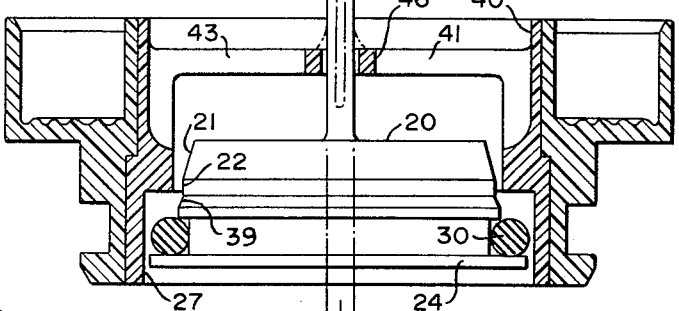
FIG. 5 is a vertical cross-sectional view of the cap construction after pressure has been released from the bottom surface of the cap.

As shown in FIG. 4, when pressure is applied to the bottom surface of shelf 24, cap 20 is pushed upwardly through the space between the shoulders 26 thereby causing pressure to be exerted on O-ring 30 between the bottom surface 35 of shoulder 26 and the top surface shelf 24. In addition, groove 23 is brought to approximately the same vertical position as O-ring 30. In this position, there is no fluid communication between the cartridge 1 and the collection means 10. As shown in FIG. 5, when pressure is released from the bottom surface of the cap 20, no pressure is exerted on the O-ring 30 by the shelf 24 and the shoulder 26 so that O-ring 30 retracts into groove 23 by reason of the tension previously applied to the O-ring 30. Furthermore, when pressure is released from the bottom surface of the cap 20, there are no frictional forces on the cap 20 sufficient to retain it within inner housing section 27. Therefore, the cap 20 is free to fall from contact with the inner housing section 27 after pressure has been released thereby opening fluid communication between cartridge 1 and collection means 10.

Figure 6:
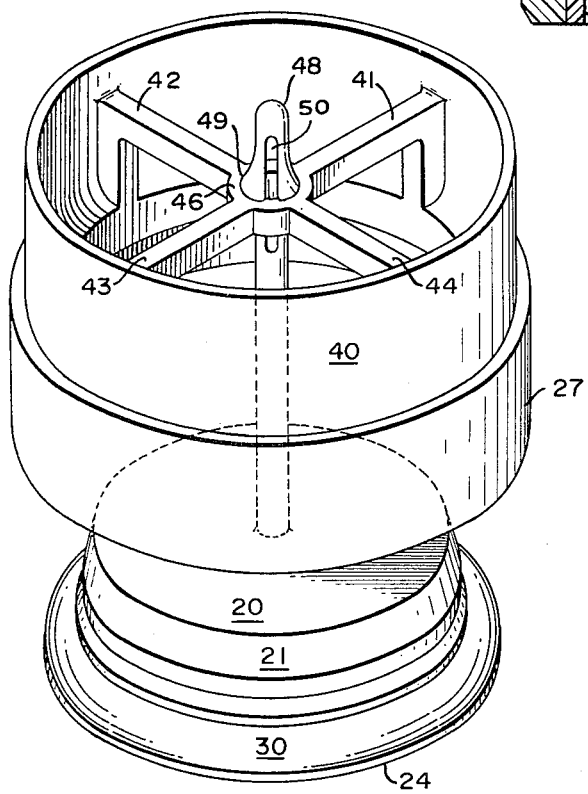
FIG. 6 is an isometric view of the cap construction of FIGS. 2 through 5.

As shown in FIG. 6, the cap 20 is provided with means to prevent its falling into collection means 10 thereby preventing the possibility of fouling any outlet means associated with collection means 10. The cylindrical extension 40 attached to shoulder 26 houses support beams 41, 42, 43 and 44 which intersect at the center of the housing. A hole 46 at the intersection of the support beams houses shaft 47. The shaft 47 extends through hole 46 and has a flexible extension 48 at its top end. The flexible extension 48 has a bead 49 formed to prevent passage of the extension 48 through the hole 47 when in place. When pressure is released, the cap 20 hangs freely from the inner housing section 27 thereby providing fluid communication between the cartridge 1 and the collection means 10 and preventing the cap 20 from dropping into the collection means 10. The extension 48 can be compressed due to the pressure of the hole 50 so that the bead 49 can be fit through hole 46 to remove the cap 20.

While the invention has been described specifically with reference to a cap having a particular surface configuration and having means to retain it within the cap housing after pressure has been released, it is to be understood that a cap retaining means is not essential to the practice of this invention. Thus, it is within the scope of this invention to provide a cap with no retaining means which is free to fall into the collection means 10 after pressure thereon is released. Furthermore, the cap need not be beveled as shown in the drawings. It is necessary only that the cap have an upper generally cylindrical surface, a recess at a vertically intermediate portion and a shelf in the lower portion having a diameter larger than the inside diameter at the housing shoulder.

I claim:

1. A check valve comprising a generally cylindrical housing, a cap adapted to fit within said housing and a sealing means adapted to fit around said cap under tension, said housing having a shoulder extending inwardly from its inside circumferential surface, said cap having an upper, generally cylindrical portion with a diameter less than the inside diameter of the housing at the shoulder, a circumferential recess adapted to house said sealing means out of contact with the inside surface of said housing and a lower generally cylindrical shelf with a diameter greater than the inside diameter of the housing at the shoulder, said recess being located between said upper and lower portions and said sealing means being movable within said housing from said upper generally cylindrical portion to said circumferential recess.

2. The valve of claim 1 having a circumferential beveled shoulder between the recess and the upper generally cylindrical portion.

3. The valve of claim 1 having means for retaining the cap adjacent the housing when said sealing means is within said recess.

4. An apparatus comprising a tubular filter cartridge, and a check valve, said check valve comprising a generally cylindrical housing, a cap adapted to fit within said housing and a sealing means adapted to fit around said cap under tension, said housing having a shoulder extending inwardly from its inside circumferential surface, said cap having an upper, generally cylindrical portion with a diameter less than the inside diameter of the housing at the shoulder, a circumferential recess adapted to house said sealing means out of contact with the inside surface of said housing and a lower generally cylindrical shelf with a diameter greater than the inside diameter of the housing at the shoulder, said recess located between said upper and lower portions, said sealing means being movable within said housing from said upper generally cylindrical portion to said circumferential recess, said housing having means for confining one end of said cartridge in sealed relationship and to provide fluid communication between the interiors of said cartridge and said housing.

5. The apparatus of claim 4 having a circumferential beveled shoulder between the recess and the upper generally cylindrical portion.

6. The apparatus of claim 4 having means for retaining the cap adjacent the housing when said sealing means is within said recess.

* * * * *